(12) United States Patent
Verbridge et al.

(10) Patent No.: US 12,117,074 B1
(45) Date of Patent: Oct. 15, 2024

(54) REDUCING LOSSES IN AN IDLED VEHICLE DRIVE UNIT

(71) Applicant: Rivian IP Holdings, LLC, Irvine, CA (US)

(72) Inventors: Mason Verbridge, Canton, MI (US); Vinaey Kalyanaraman, Rancho Palos Verdes, CA (US); Cameron Philip Williams, Dexter, MI (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/431,883

(22) Filed: Feb. 2, 2024

(51) Int. Cl.
*B60K 1/02* (2006.01)
*F16H 57/04* (2010.01)
*B60K 1/00* (2006.01)

(52) U.S. Cl.
CPC ........... *F16H 57/0476* (2013.01); *B60K 1/02* (2013.01); *F16H 57/0409* (2013.01); *F16H 57/0413* (2013.01); *B60K 2001/006* (2013.01); *B60K 2001/008* (2013.01)

(58) Field of Classification Search
CPC ............. F16H 57/0476; F16H 57/0409; F16H 57/0413; B60K 1/02; B60K 2001/006; B60K 2001/008
See application file for complete search history.

(56) References Cited

U.S. PATENT DOCUMENTS

| | | | | |
|---|---|---|---|---|
| 2,267,066 A | * | 12/1941 | Wolf | B60K 5/08 477/6 |
| 2,384,470 A | * | 9/1945 | Keese | B60K 5/08 477/6 |
| 2,448,014 A | * | 9/1948 | Buckendale | B60H 1/00314 60/708 |
| 7,482,769 B2 | * | 1/2009 | Kutsuna | B60W 20/50 318/254.1 |
| 7,946,951 B2 | * | 5/2011 | Kimura | B60K 6/365 477/3 |

FOREIGN PATENT DOCUMENTS

| | | | | |
|---|---|---|---|---|
| DE | 102019201245 A1 | * | 8/2020 | B60L 15/20 |
| GB | 2591310 A | * | 7/2021 | B60H 1/143 |
| JP | 2000078705 A | * | 3/2000 | |
| JP | 2014210566 A | * | 11/2014 | B60W 10/06 |

* cited by examiner

*Primary Examiner* — Sherry L Estremsky
(74) *Attorney, Agent, or Firm* — Patterson + Sheridan, LLP

(57) ABSTRACT

A vehicle includes first and second drive units, such as drive units that each include an electric motor and a gear train coupling the electric motor to one or more wheels. A first drive unit may be idled while the second drive unit continues to induce movement of the vehicle. Losses within the first drive unit while idled may be reduced by heating the first drive unit, such as with heat generated by the second drive unit. A cooling system is present and may be used to heat the first drive unit by directing fluid exiting the second drive unit into the first drive unit before entering the cooling system or bypassing the cooling system entirely. Oil circulation within the first drive unit may facilitate heating of the gear train by bypassing a heat exchanger receiving the oil and the fluid.

17 Claims, 11 Drawing Sheets

US 12,117,074 B1

REDUCING LOSSES IN AN IDLED VEHICLE DRIVE UNIT

INTRODUCTION

The present disclosure relates to thermal management of a vehicle drive unit.

SUMMARY

The present disclosure describes an approach for reducing losses in idled drive units. In one aspect, a vehicle includes a chassis, a first drive unit mounted to the chassis and configured to drive one or more first wheels of the vehicle, and a second drive unit mounted to the chassis and configured to drive one or more second wheels of the vehicle. A control system is coupled to the first drive unit and the second drive unit. The control system is configured to idle the first drive unit while the second drive unit is not idled and induces movement of the vehicle. The control system is configured to heat the first drive unit while the first drive unit is idled.

DETAILED DESCRIPTION

Electric motors typically provide a large amount of torque. A battery electric vehicle (BEV) may include multiple drive motors, e.g., front and rear drive motors or per-wheel drive motors. The multiple drive motors provide all-wheel drive operation as well as high torque when accelerating, climbing, off-roading, etc. However, most of the time that a BEV is driven on paved roads, the amount of torque needed is much less than the available torque.

To increase the range of the BEV, one or more drive motors may be idled when torque is not needed or requested from the drive motor(s). In the case of a pure induction drive motor, no permanent magnets are present on the rotor such that spinning of the rotor does not induce eddy currents and corresponding losses. Accordingly, an induction drive motor may be idled by ceasing to supply current to the drive motor. Windage losses, i.e., aerodynamic drag on the rotor, will continue but are relatively small. A gear train coupling the induction drive motor to one or more driven wheels will transfer rotation of the wheels to the induction drive motor while the induction drive motor is idled. The transfer of rotation through the gear train introduces additional losses, particularly power loss due to oil within the gear train.

In the embodiments disclosed herein, a vehicle includes at least two drive units, each including a motor and a gear train. The gear train of an idled drive unit may be heated with waste heat generated by other sources within the BEV. In particular, heat generated by a non-idled drive unit is transferred to the gear train of the idled drive unit, which reduces the viscosity of oil lubricating the gear train and thereby reduces power loss caused by the gear train. The non-idled drive unit continues to be powered and induces movement of the vehicle subject to control of the driver.

Figure 1A:
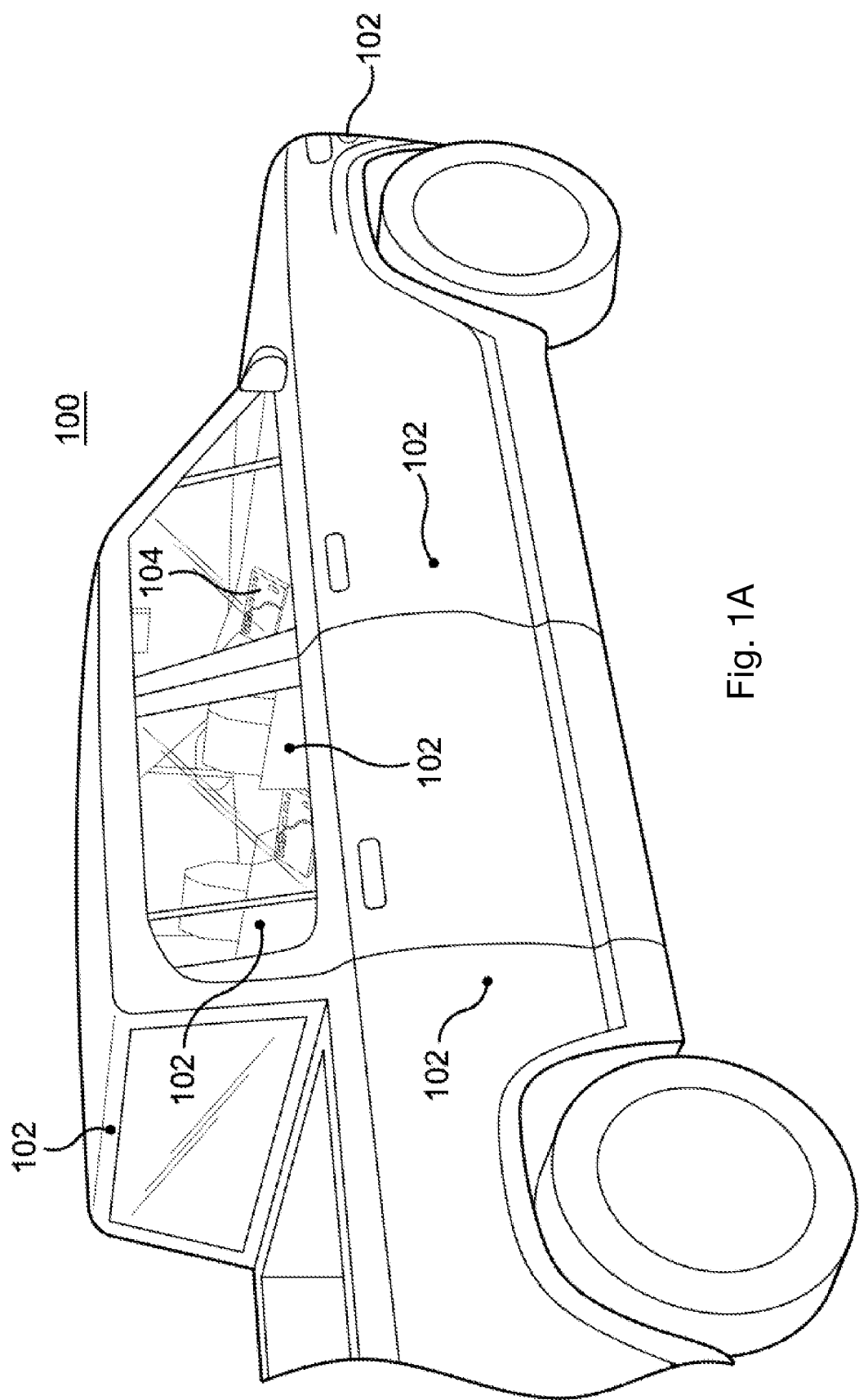
FIG. 1A illustrates an example vehicle having multiple drive units that may be operated in accordance with certain embodiments.

FIG. 1A illustrates an example vehicle 100. As seen in FIG. 1A, the vehicle 100 has multiple exterior cameras 102 and one or more front displays 104. Each of these exterior cameras 102 may capture a particular view or perspective on the outside of the vehicle 100. The images or videos captured by the exterior cameras 102 may then be presented on one or more displays in the vehicle 100, such as the one or more front displays 104, for viewing by a driver.

Figure 1B:
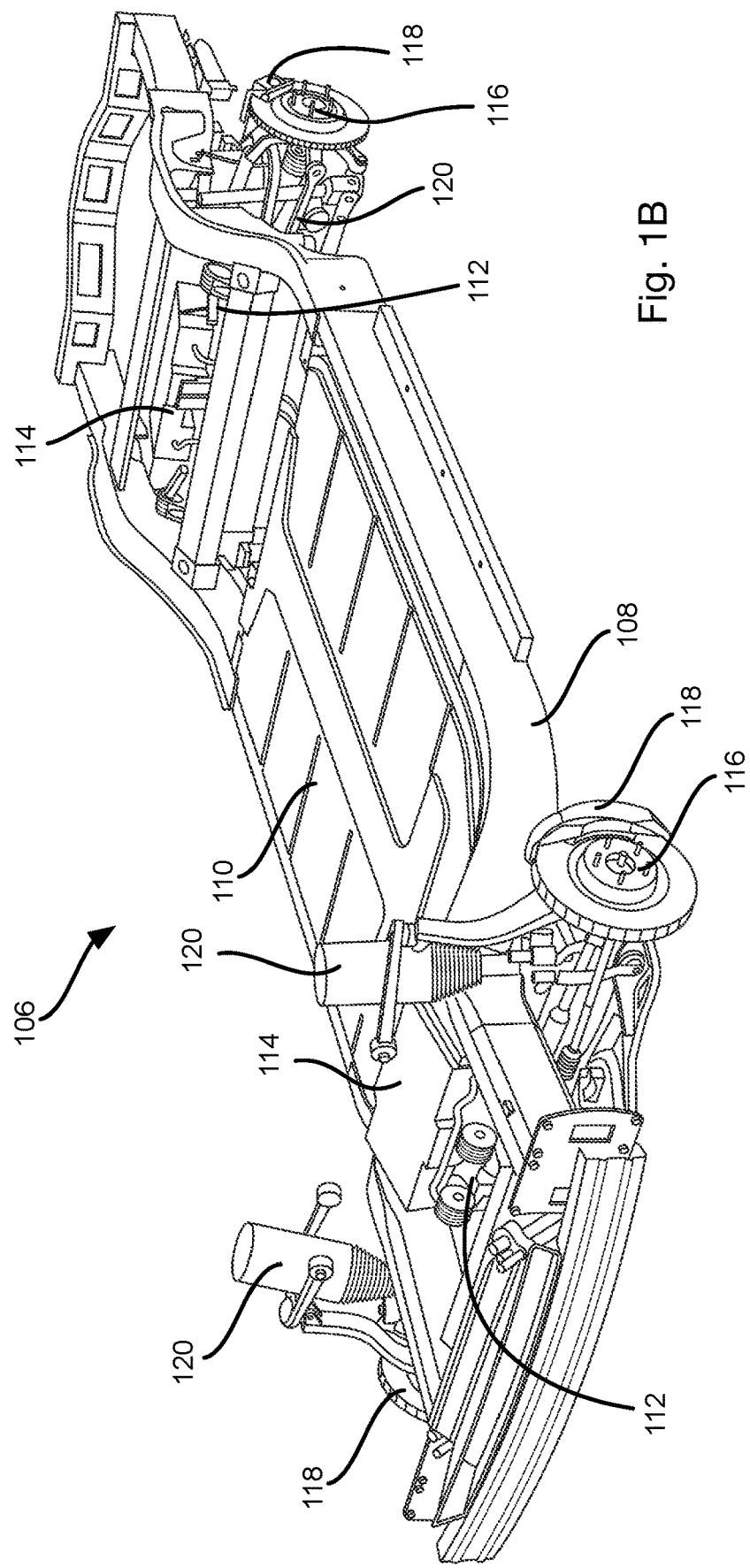
FIG. 1B illustrates a chassis of a vehicle having multiple drive units that may be operated in accordance with certain embodiments.

Referring to FIG. 1B, the vehicle 100 may include a chassis 106 including a frame 108 providing a primary structural member of the vehicle 100. The frame 108 may be formed of one or more beams or other structural members or may be integrated with the body of the vehicle (i.e., unibody construction).

In embodiments where the vehicle 100 is a battery electric vehicle (BEV) or possibly a hybrid vehicle, a large battery 110 is mounted to the chassis 106 and may occupy a substantial (e.g., at least 80 percent) of an area within the frame 108. For example, the battery 110 may store from 100 to 200 kilowatt hours (kWh). The battery 110 may be a lithium-ion battery or other type of rechargeable battery. The battery may be substantially planar in shape.

Power from the battery 110 may be supplied to one or more drive units 112. Each drive unit 112 may be formed of an electric motor and possibly a gear train providing a gear reduction. In some embodiments, there is a single drive unit 112 driving either the front wheels or the rear wheels of the vehicle 100. In another embodiment, there are two drive units 112, each driving either the front wheels or the rear wheels of the vehicle 100. In yet another embodiment, there are four drive units 112, each drive unit 112 driving one of four wheels of the vehicle 100.

Power from the battery 110 may be supplied to the drive units 112 by power electronics 114 of each drive unit 112. The power electronics 114 may include inverters configured to convert direct current (DC) from the battery 110 into alternating current (AC) supplied to the motors of the drive units 112.

The drive units 112 are coupled to two or more hubs 116 to which wheels may mount. Each hub 116 includes a corresponding brake 118, such as the illustrated disc brakes. The drive units 112 or other component may also provide regenerative braking. Each hub 116 is further coupled to the frame 108 by a suspension 120. The suspension 120 may include metal or pneumatic springs for absorbing impacts. The suspension 120 may be implemented as a pneumatic or hydraulic suspension capable of adjusting a ride height of the chassis 106 relative to a support surface. The suspension 120 may include a damper with the properties of the damper being either fixed or adjustable electronically.

In the embodiment of FIG. 1B and in the discussion below, the vehicle 100 is a battery electric vehicle. However, the systems and methods disclosed herein may be used for any type of vehicle, including vehicles powered by an internal combustion engine (ICE), hybrid drivetrain, hydrogen fuel cell drivetrain, or other type of drivetrain that may have a portion that is idled during some modes of operation. For example, a front or rear differential of an all-wheel drive vehicle. In another example, in a hybrid drive train, an idled drive unit including an electric motor may be heated with waste heat from an ICE according to the approaches described herein.

Figure 2:
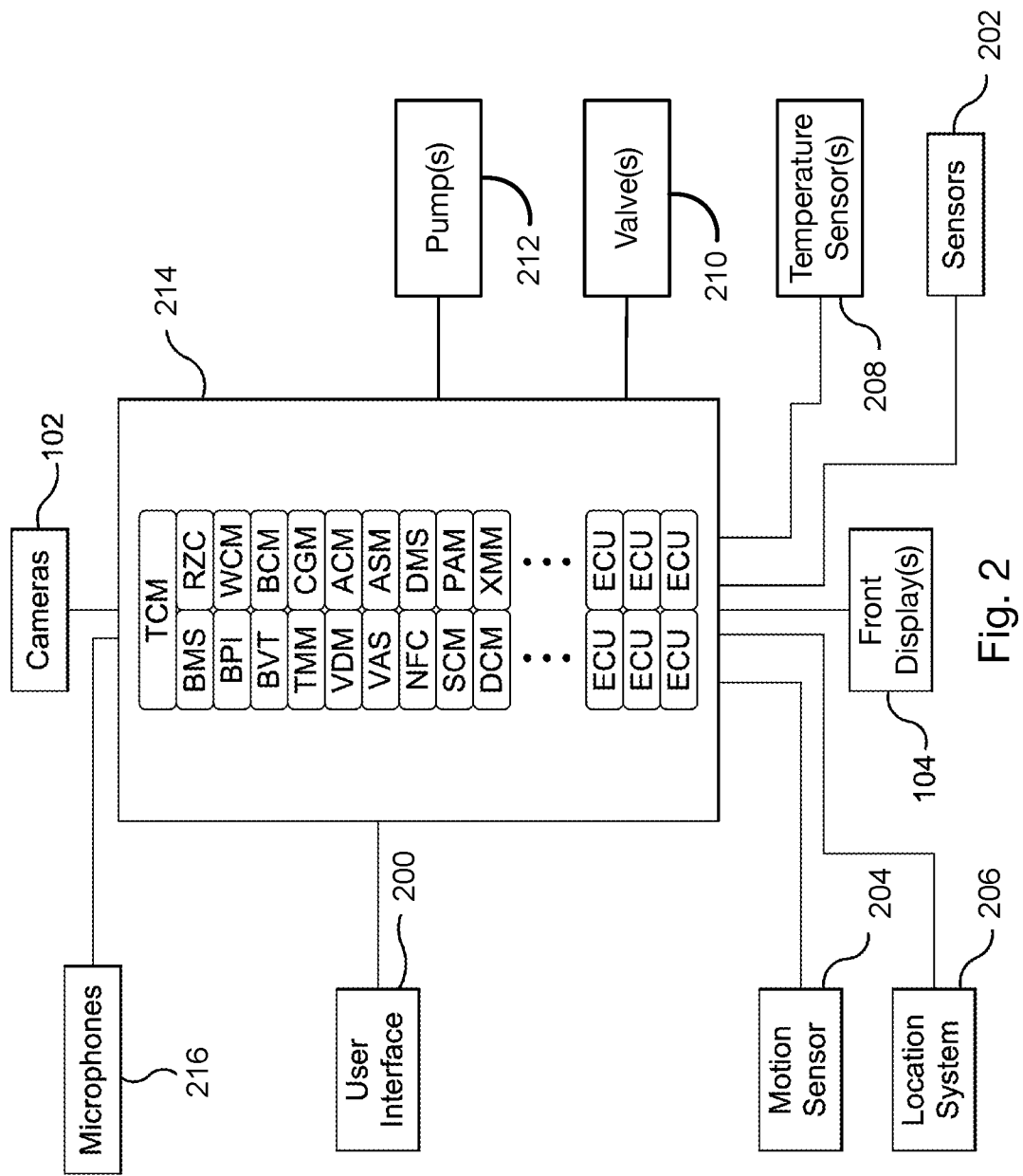
FIG. 2 is a schematic block diagram of components for operating multiple drive units in accordance with certain embodiments.

FIG. 2A illustrates example components of the vehicle 100 of FIG. 1A. As seen in FIG. 2A, the vehicle 100 includes the cameras 102, the one or more front displays 104, a user interface 200, one or more sensors 202, a motion sensor 204, and a location system 206. The one or more sensors 202 may include ultrasonic sensors, radio detection and ranging (RADAR) sensors, light detection and ranging (LIDAR) sensors, or other types of sensors. The location system 206 may be implemented as a global positioning system (GPS) receiver. The user interface 200 allows a user, such as a driver or passenger in the vehicle 100, to provide input.

The components of the vehicle 100 may include one or more temperature sensors 208. The temperature sensors 208 may include sensors configured to sense an ambient air temperature, temperature of the battery 110, temperature of power electronics 114, temperature of each drive unit 112 and/or each motor of each drive unit 112, temperature of coolant fluid entering or leaving a coolant system, temperature of oil within a drive unit 112, or the temperature of any other component of the vehicle 100.

The components of the vehicle 100 may include one or more valves 210 and one or more pumps 212 controlling the flow of coolant fluid and/or oil through the battery 110, power electronics 114, drive units 112, or other components, such as according to the approaches described below.

A control system 214 executes instructions to perform at least some of the actions or functions of the vehicle 100, including the functions described in relation to FIGS. 3A to 7. For example, as shown in FIG. 2A, the control system 214 may include one or more electronic control units (ECUs) configured to perform at least some of the actions or functions of the vehicle 100, including the functions described in relation to FIGS. 3A to 7. In certain embodiments, each of the ECUs is dedicated to a specific set of functions. Each ECU may be a computer system and each ECU may include functionality described below in relation to FIGS. 3A to 7.

Certain features of the embodiments described herein may be controlled by a Telematics Control Module (TCM) ECU. The TCM ECU may provide a wireless vehicle communication gateway to support functionality such as, by way of example and not limitation, over-the-air (OTA) software updates, communication between the vehicle and the internet, communication between the vehicle and a computing device, in-vehicle navigation, vehicle-to-vehicle communication, communication between the vehicle and landscape features (e.g., automated toll road sensors, automated toll gates, power dispensers at charging stations), or automated calling functionality.

Certain features of the embodiments described herein may be controlled by a Central Gateway Module (CGM) ECU. The CGM ECU may serve as the vehicle's communications hub that connects and transfer data to and from the various ECUs, sensors, cameras, microphones, motors, displays, and other vehicle components. The CGM ECU may include a network switch that provides connectivity through Controller Area Network (CAN) ports, Local Interconnect Network (LIN) ports, and Ethernet ports. The CGM ECU may also serve as the master control over the different vehicle modes (e.g., road driving mode, parked mode, off-roading mode, tow mode, camping mode), and thereby control certain vehicle components related to placing the vehicle in one of the vehicle modes.

In various embodiments, the CGM ECU collects sensor signals from one or more sensors of vehicle 100. For example, the CGM ECU may collect data from cameras 102, sensors 202, motion sensor 204, location system 206, and temperature sensors 208. The sensor signals collected by the CGM ECU are then communicated to the appropriate ECUs for performing, for example, the operations and functions described in relation to FIGS. 3A to 7.

The control system 214 may also include one or more additional ECUs, such as, by way of example and not limitation: a Vehicle Dynamics Module (VDM) ECU, an Experience Management Module (XMM) ECU, a Vehicle Access System (VAS) ECU, a Near-Field Communication (NFC) ECU, a Body Control Module (BCM) ECU, a Seat Control Module (SCM) ECU, a Door Control Module (DCM) ECU, a Rear Zone Control (RZC) ECU, an Autonomy Control Module (ACM) ECU, an Autonomous Safety Module (ASM) ECU, a Driver Monitoring System (DMS) ECU, and/or a Winch Control Module (WCM) ECU. If vehicle 100 is an electric vehicle, one or more ECUs may provide functionality related to the battery pack of the vehicle, such as a Battery Management System (BMS) ECU, a Battery Power Isolation (BPI) ECU, a Balancing Voltage Temperature (BVT) ECU, and/or a Thermal Management Module (TMM) ECU. In various embodiments, the XMM ECU transmits data to the TCM ECU (e.g., via Ethernet, etc.). Additionally or alternatively, the XMM ECU may transmit other data (e.g., sound data from microphones 216, etc.) to the TCM ECU. The TMM ECU may be coupled to the valves 210 and one or more pumps 212 to perform the methods described herein with respect to FIGS. 3A to 7.

FIGS. 3A to 6D illustrate example approaches to heating an idled drive unit 112. In the example embodiments described herein, the idled drive unit includes a front drive unit (FDU) 112a and the non-idled drive unit includes a rear drive unit (RDU) 112b. However, the opposite arrangement may also be implemented in which the FDU 112a is not idled while the RDU 112b is idled. As used herein "idled" may be understood as the motor of the FDU 112a not receiving power from the battery 110 to induce torque on the motor. In some embodiments, "idled" may also be understood as not generating power transmitted to the battery 110, i.e., regenerative breaking using the motor of the FDU 112a. As used herein the "idled drive unit" refers to the drive unit that is temporarily idled when not needed and does not imply that the idled drive unit is idled at all times.

In the examples below, a single FDU 112a and a single RDU 112b are referenced with the understanding that two FDUs 112a and two RDUs 112b may be handled in the same way. For example, an inlet to an FDU 112a may be substituted with a common inlet coupled to inlets of two FDUs 112a, an outlet from an FDU 112a may be substituted with a common outlet coupled to outlets of two FDUs 112a. Likewise, an inlet to an RDU 112b may be substituted with a common inlet coupled to inlets of two RDUs 112b, an outlet from an RDU 112b may be substituted with a common outlet coupled to the outlets of two RDUs 112b.

In the various embodiments described below, the FDU 112a receives waste heat from one or more components of the vehicle 100, such as the RDU 112b. Other components from which the FDU 112a may receive waste heat include a DC-to-DC converter, charging circuit, the battery 110, other electronic components, such as the control system 214, a condenser of an air conditioner, or other components of the vehicle 100. Inasmuch as the heating of the FDU 112a is intended to reduce losses and extend the range of the battery 110, the heat supplied to the FDU 112a may be purely waste heat as opposed to heat generated for the purpose of heating using current from the battery 110. However, there may be a temperature below which drawing current from the battery 110 for the purpose of heating the FDU 112a provides efficiency gains. Heat generated for the purpose of heating using current from the battery may include heat generated using a resistive heating element, heat pump, or by deliberate operation of a motor or other component in an inefficient manner for purposes of generating additional heat.

Figure 3A:
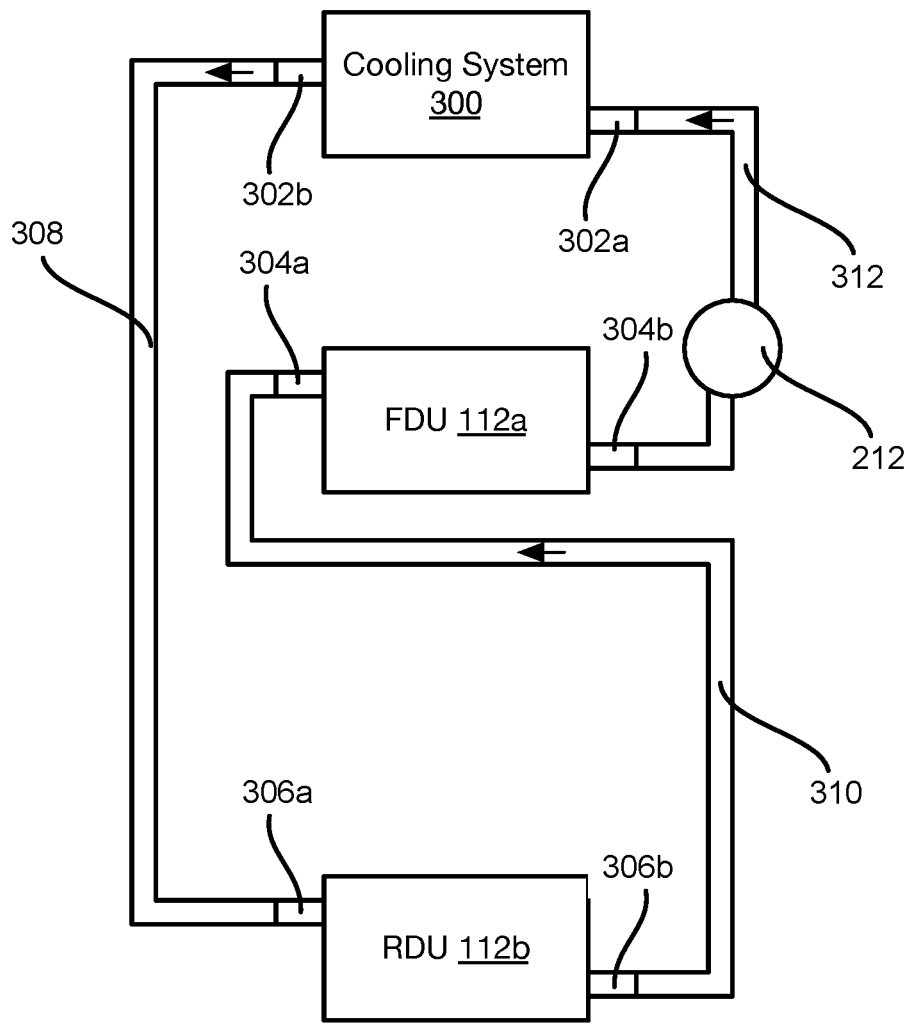
FIG. 3A illustrates a first embodiment for reducing losses in an idled drive unit in accordance with certain embodiments.

Referring specifically to FIG. 3A, the vehicle 100 may include a cooling system 300. The cooling system 300 may include a radiator, a fan for forcing air over the radiator, a heat pump, or other component for expelling heat to an environment of the vehicle 100. The cooling system 300 has an inlet 302a through which fluid enters the cooling system 300 and an outlet 302b through which fluid leaves the cooling system 300, with the temperature at the inlet 302a being higher than a temperature at the outlet 302b. The fluid may be water, propylene glycol (antifreeze), a mix of water and propylene glycol, or some other fluid.

The FDU 112a has an inlet 304a through which the fluid enters the FDU 112a and an outlet 304b through which the fluid leaves the FDU 112a. The RDU 112b has an inlet 306a through which the fluid enters the RDU 112b and an outlet 306b through which the fluid leaves the RDU 112b.

In the embodiment of FIG. 3A, the FDU 112a is interposed in a return path of the fluid between the RDU 112b and the cooling system 300 such that the FDU 112a will be heated by the fluid when the temperature of the FDU 112a is lower than the temperature of the fluid. For example, a fluid path 308 couples the outlet 302b of the cooling system 300 to the inlet 306a of the RDU 112b. A fluid path 310 couples the outlet 306b of the RDU 112b to the inlet 304a of the FDU 112a. A fluid path 312 couples the outlet 304b of the FDU 112a to the inlet 302a of the cooling system 300. As used herein a "fluid path" may be understood as including some or all of one or more hoses (e.g., insulated hoses), one or more fittings, fluid paths formed within a housing, or other structures through which fluid may flow when traveling between components.

One or more of the pumps 212 may be positioned within any of the fluid paths 308, 310, 312 in order to force fluid to travel along the fluid paths 308, 310, 312 and through the FDU 112a, RDU 112b, and cooling system 300. In the illustrated embodiment, a pump 212 is positioned in the fluid path 308.

In the embodiment of FIG. 3A, the FDU 112a may be idled and have a lower temperature than the fluid. Heat is transferred to the fluid by the RDU 112b and a portion of that heat will be transferred to the FDU 112a in order to increase the temperature of the FDU 112a, which will cause a corresponding reduction in the viscosity of oil within the FDU 112a and reduce losses within the FDU 112a.

When the FDU 112a is not idled, the temperature of the FDU 112a may rise above that of the fluid such that heat will be transferred to the fluid by the FDU 112a. In the embodiment of FIG. 3A, the FDU 112a may have a higher operating temperature than the RDU 112b since the fluid reaching the FDU 112a will have previously been heated by the RDU 112b. However, for many applications this arrangement may be acceptable, and the motor and gear train of the FDU 112a may remain below an acceptable temperature. For example, the FDU 112a may be more lightly loaded and therefore require less cooling.

Figure 3B:
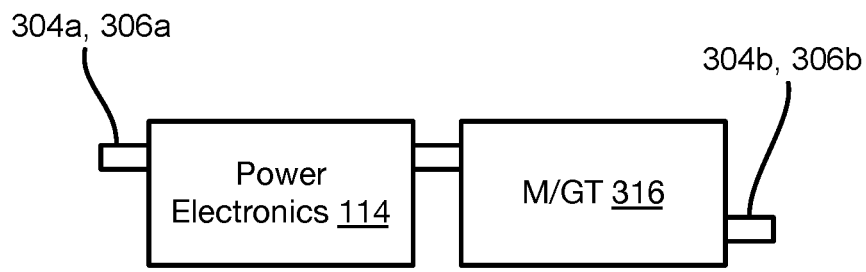
FIG. 3B illustrates example coolant flow through a drive unit in accordance with certain embodiments.

Referring to FIG. 3B, within each of the FDU 112a and RDU 112b, there may be power electronics 114 and a motor and gear train (M/GT) 316. In some embodiments, the fluid received at the inlet 304a, 306a is first in thermal contact with the power electronics 114, is in thermal contact with the M/GT 316, and then exits through the outlet 304b, 306b. Thermal contact with the M/GT 316 may be through a heat exchanger receiving flow of oil circulating through the M/GT 316, as described below in further detail with respect to FIGS. 6A to 6D.

Figure 4A:
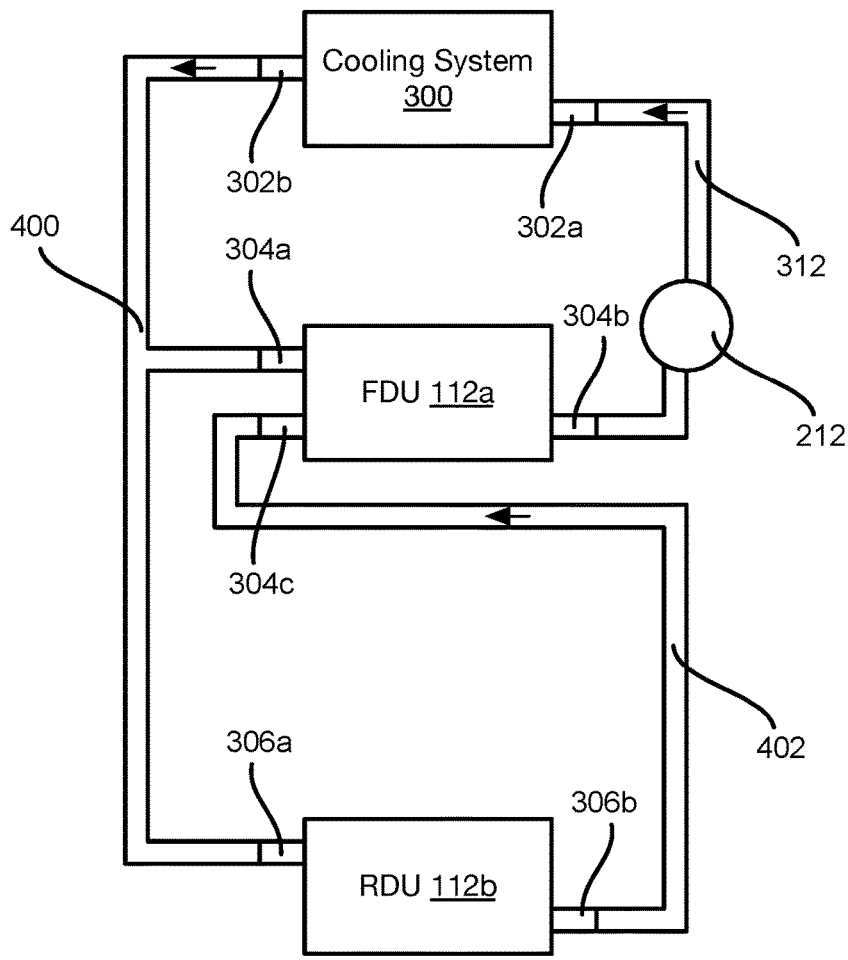
FIG. 4A illustrates a second embodiment for reducing losses in an idled drive unit in accordance with certain embodiments.
Figures 4B, 4C:
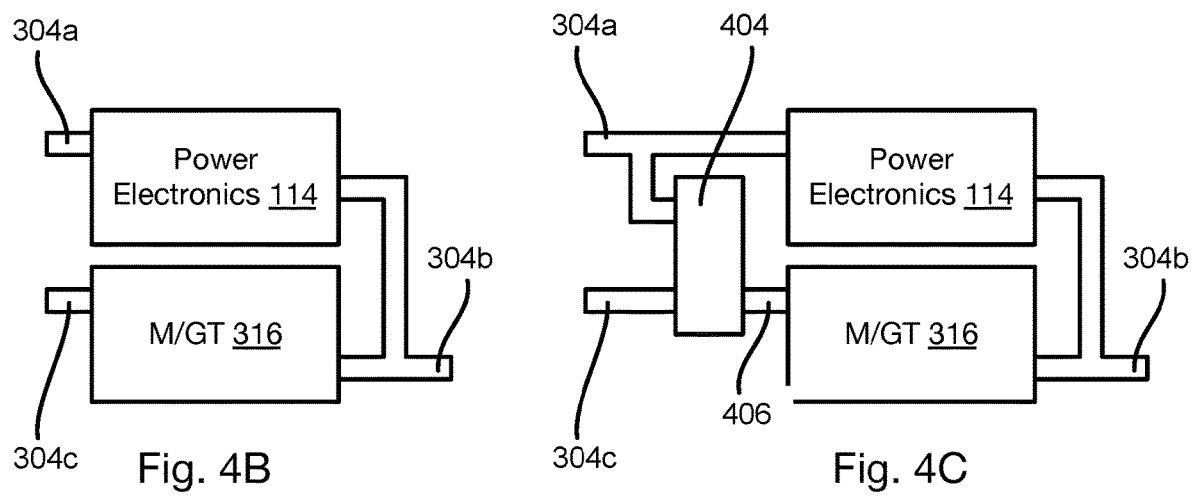
FIGS. 4B and 4C illustrates alternative coolant flow through a drive unit in accordance with certain embodiments.

Referring to FIGS. 4A, 4B, and 4C, in a second embodiment, the FDU 112a includes two inlets 304a, 304c. A fluid path 400 receives fluid exiting the cooling system 300 and is coupled to the inlet 304a and to the inlet 306a. A fluid path 402 couples the outlet 306b to the inlet 304c. The fluid path 312 may couple the outlet 304b to the inlet 302a as described above. A pump 212 is positioned within the fluid path 312 or the fluid path 400 upstream of the inlet 304a to force fluid through the FDU 112a, RDU 112b, and cooling system 300.

Referring specifically to FIG. 4B, the inlet 304a may conduct fluid into thermal contact with the power electronics 114 of the FDU 112a whereas the inlet 304c conducts fluid into thermal contact with the M/GT 316 of the FDU 112a. Fluid received through both inlets 304a, 304c may pass out of the FDU 112a through a common outlet 302b. In the embodiment of FIG. 4B, the power electronics 114, which may require cooler operation or simply not benefit from heating, continue to receive fluid directly from the cooling system 300 whereas the M/GT 316 will receive fluid that has previously been in thermal contact with the RDU 112b in order to transfer heat from the RDU 112b to the FDU 112a.

Referring specifically to FIG. 4C, in some embodiments, the inlets 304a, 304c are coupled to inlets of a valve 404 having an outlet 406. As shown, the inlet 304a may also be coupled to the power electronics 114 in bypass of the valve 404. The valve 404 may be one of the valves 210 coupled to the control system 214 and be electronically controlled by the control system 214. The valve 404 may be configured such that either of the inlets 304a, 304c may be coupled to the outlet 406, such as a commercially available three-port ball valve or other type of valve. Fluid that exits through the outlet 406 will pass into thermal contact with the M/GT 316 and pass out of the outlet 304b. Likewise, fluid that passes into thermal contact with the power electronics 114 will pass out of the outlet 304b.

When the FDU 112a is not idled or is otherwise at a temperature such that heating is not needed, the control system 214 causes the valve 404 to couple the inlet 304a to the outlet 406 such that cooled fluid from the fluid path 400 will enter and cool the M/GT 316. When the FDU 112a is idled or otherwise in need of heating, the control system 214 causes the valve 404 to couple the inlet 304c to the outlet 406 such that heat from the RDU 112b is transferred to the M/GT 316.

Figure 5:
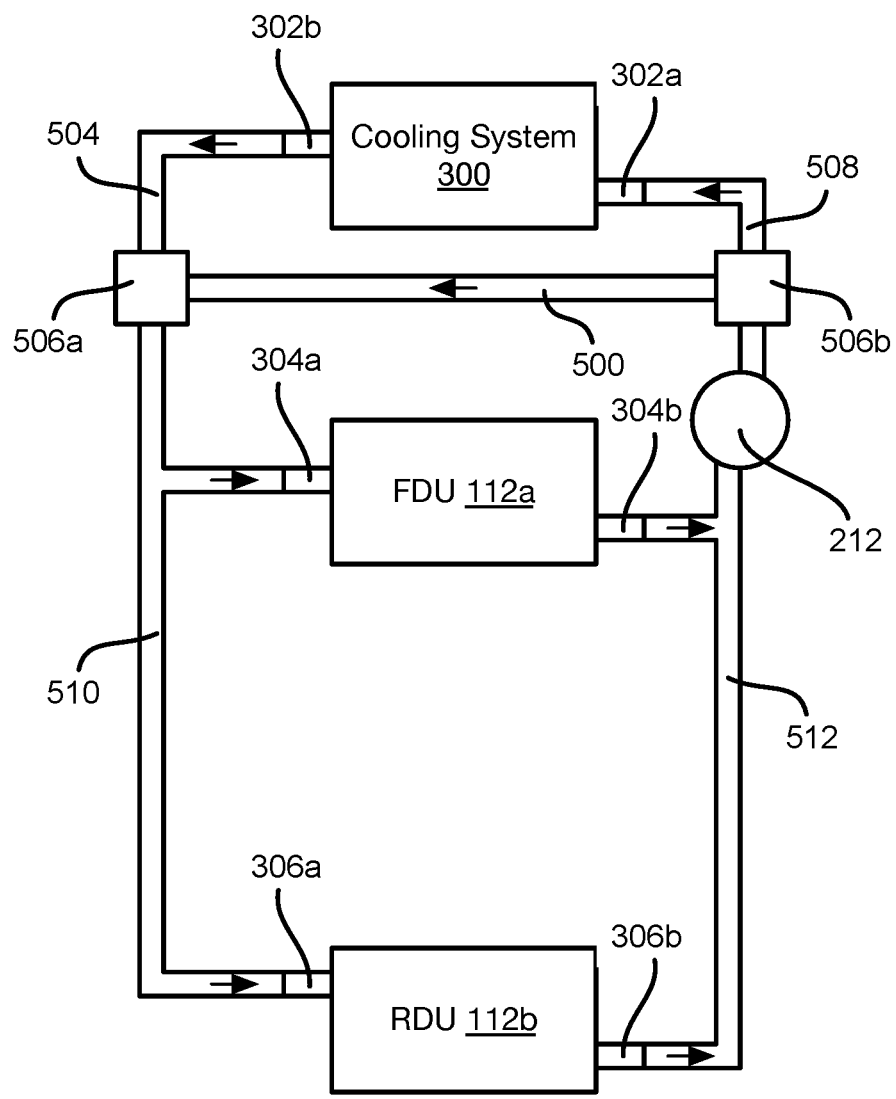
FIG. 5 illustrates a third embodiment for reducing losses in an idled drive unit in accordance with certain embodiments.

Referring to FIG. 5, in a third embodiment, a bypass path 500 bypasses the cooling system 300 when heating of the FDU 112a is needed, such as while the FDU 112a is idled.

For example, a fluid path 504 is coupled to the outlet 302*b* and to a valve 506*a*. A fluid path 508 is coupled to the inlet of the cooling system 300 and a valve 506*b*. The valves 506*a*, 506*b* are further coupled to the bypass path 500. The valve 506*a* is further coupled to a fluid path 510 that is coupled to the inlets 304*a*, 306*a*. The valve 506*b* is further coupled to a fluid path 512 that is coupled to the outlets 304*b*, 306*b*. The pump 212 may be positioned in the fluid path 510 or 512 in order to circulate fluid through the cooling system 300 or bypass path 500 and through the FDU 112*a* and RDU 112*b*.

When heating of the FDU 112*a* is performed, such as while the FDU 112*a* is idled, the valve 506*a* couples the fluid path 510 to the bypass path 500 and the valve 506*b* couples the fluid path 512 to the bypass path 500. When heating of the FDU 112*a* is not performed, such as when the FDU 112*a* is not idled or is otherwise at a temperature when heating is not helpful, the valve 506*a* couples the fluid path 510 to the outlet 302*b*, and the valve 506*b* couples the fluid path 512 to the inlet 302*a*.

FIGS. 6A to 6D illustrate possible embodiments of the FDU 112*a* for facilitating heating of the FDU 112*a* when idled. The RDU 112*b* may have any of the configurations of FIGS. 6A to 6D or a different configuration. The embodiments of FIGS. 6A to 6D may be used alone or in combination with the embodiments of FIGS. 3A to 5.

Figure 6A:
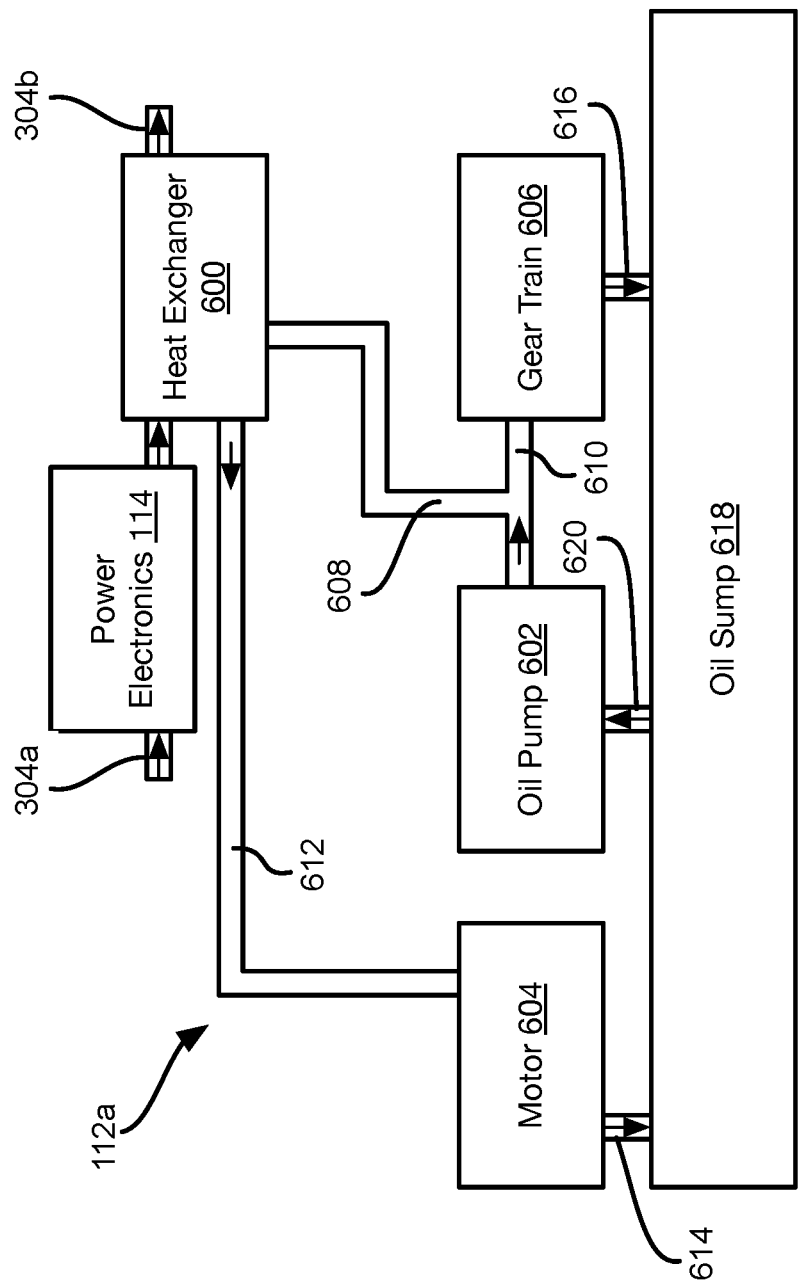
FIGS. 6A to 6D illustrate example oil circulation paths of a drive unit for reducing losses while idled in accordance with certain embodiments.

Referring specifically to FIG. 6A, a heat exchanger 600 may be mounted within or on the FDU 112*a* and receive the fluid passing into the FDU 112*a* through the inlet 304*a* (or inlet 304*c* for the embodiment of FIG. 4A). In the illustrated embodiment, the heat exchanger 600 is shown in series with the power electronics 114, with the fluid first passing through the power electronics 114 and then passing through the heat exchanger 600 and out of the outlet 304*b*. However, in other embodiments, the power electronics 114 and heat exchanger 600 may be arranged in parallel.

The FDU 112*a* may include an oil pump 602, the motor 604 of the M/GT 316, and the gear train 606 of the M/GT 316. The oil pump 602 forces oil through the gear train 606 in order to lubricate and cool the gears of the gear train 606 and to heat the gear train 606 when the FDU 112*a* is idled. The oil pump 602 may force oil through or around the motor 604, such as around a case, through a shaft, or through or around other components of the motor 604 in order to draw away heat created by friction, electrical resistance, eddy currents, or other sources. In some embodiments, the motor 604 is an induction motor having a rotor lacking permanent magnets such that spinning of the motor when the motor 604 is not supplied with current will not induce eddy currents.

The oil forced through the gear train 606 may bypass the heat exchanger 600 in order to facilitate heating of the gear train 606 with any heat generated by the motor 604 and to reduce the amount of heat drawn away from the gear train 606. For example, as shown in FIG. 6A, fluid path 608 may conduct oil output by the oil pump 602 to the heat exchanger 600 while a fluid path 610 conducts oil output by the oil pump 602 to the gear train 606. A fluid path 612 conducts oil from the heat exchanger 600 to the motor 604. After passing through the motor 604 or gear train 606, the oil returns to the oil pump 602. For example, fluid paths 614, 616 may conduct oil output from the motor 604 and gear train 606, respectively, to an oil sump 618. A fluid path 620 may then conduct oil from the oil sump 618 to the oil pump 602.

As is apparent, the circulation of oil according to the embodiment of FIG. 6A will supply oil that was heated by the motor 604 and by previous traversal of the gear train 606 to the gear train 606 without cooling due to traversal of the heat exchanger 600. The oil within the gear train 606 and the gear train 606 itself will therefore be warmer and have less loss due to viscosity of the oil.

Figure 6B:
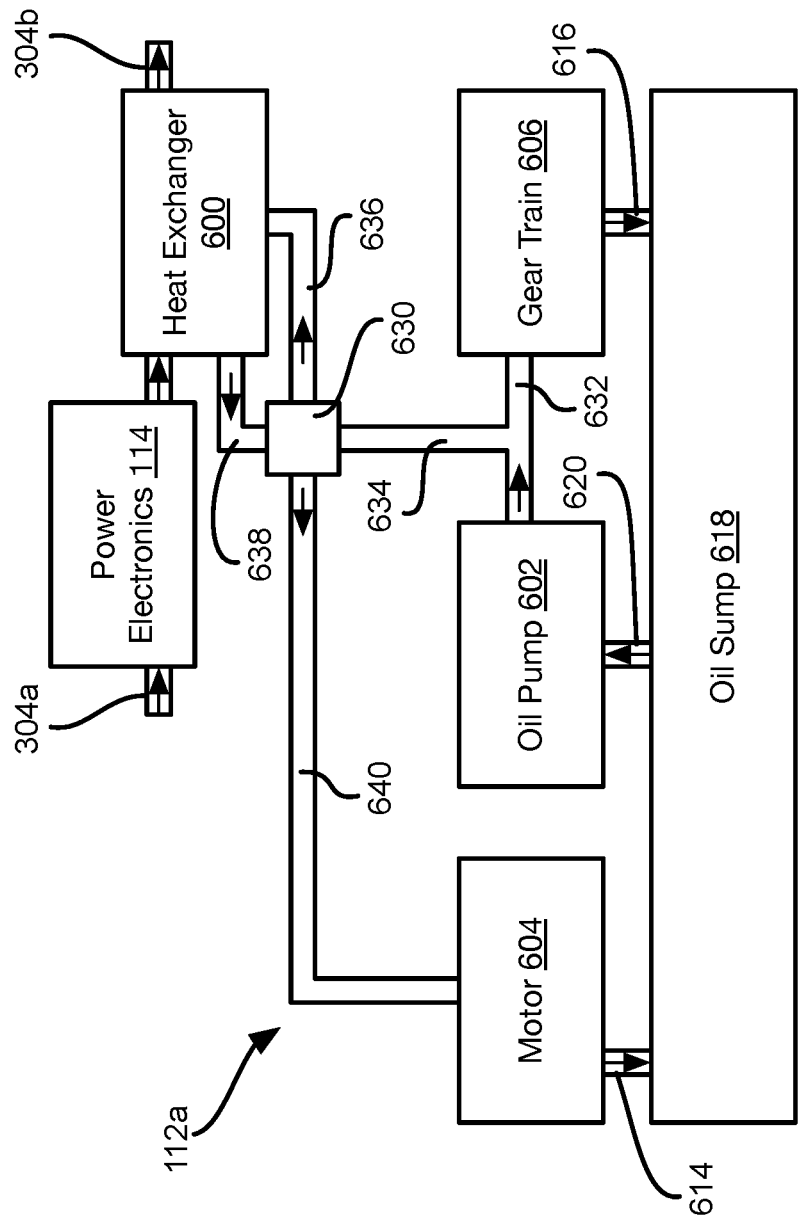

Referring to FIG. 6B, in some embodiments, the heat exchanger 600 may be bypassed by all oil flow from the oil pump 602 to reduce heat loss to the fluid passing through the heat exchanger. For example, one or more valves 630 may control the flow of oil from the oil pump 602 and direct the flow to the motor 604 directly or by way of the heat exchanger 600. For example, fluid paths 632, 634 may conduct oil output by the oil pump 602 to the gear train 606 and to the one or more valves 630. Fluid path 636 couples the one or more valves 630 to the inlet of the heat exchanger 600 and fluid path 638 couples the one or more valves 630 to the outlet of the heat exchanger 600. Fluid path 640 couples the motor 604 to the one or more valves 630.

In a first state of the one or more valves 630 in which the heat exchanger 600 is bypassed, the fluid path 634 is coupled to fluid path 640 and fluid paths 636, 638 are isolated from the output of the oil pump 602. The first state may be used when the temperature of the fluid is too low to heat the gear train 606 when the FDU 112*a* is idled or is otherwise in need of heating. In a second state of the one or more valves 630 in which the heat exchanger 600 is not bypassed, the fluid path 634 is coupled to fluid path 636 and fluid path 638 is coupled to the fluid path 640.

Figure 6C:
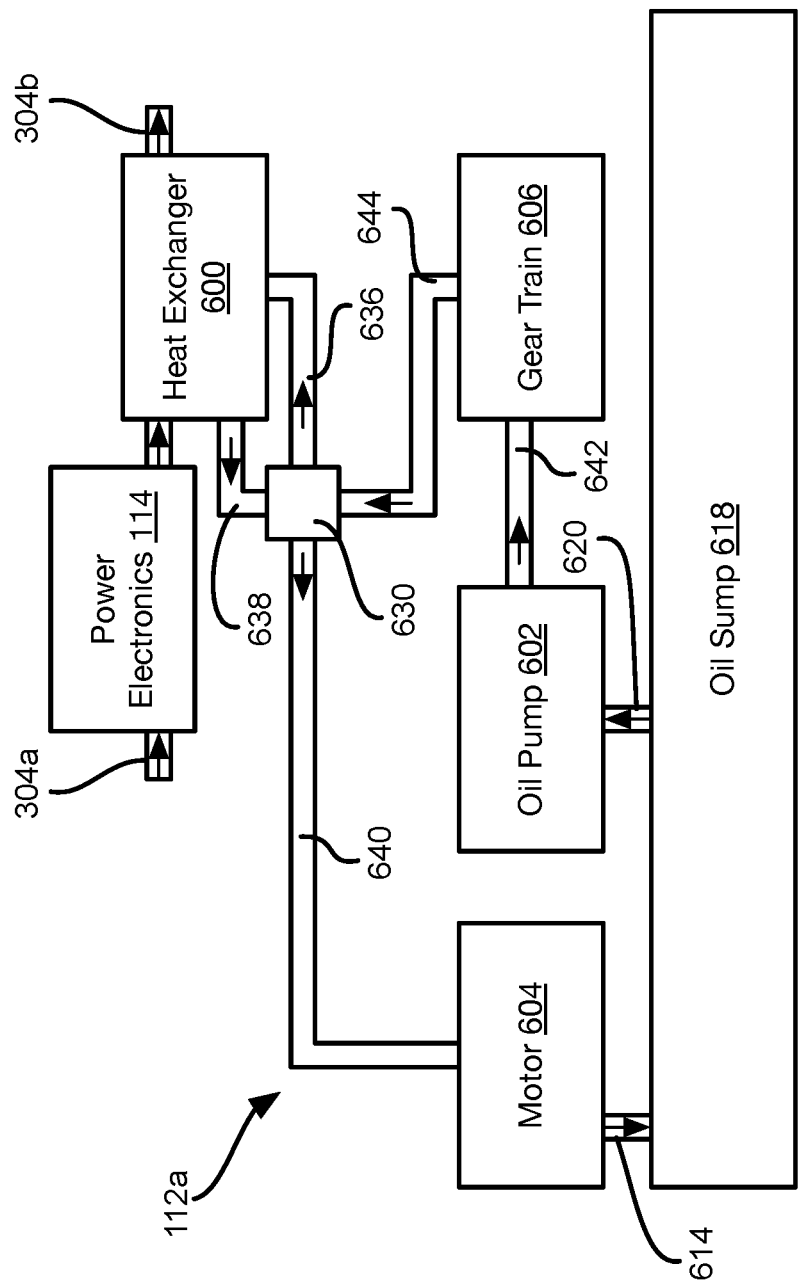

Referring to FIG. 6C, in some embodiments, all output of the oil pump 602 passes through the gear train 606. The oil output from the gear train 606 may be input to the heat exchanger 600 directly or by way of the one or more valves 630. For example, a fluid path 642 may couple the output of the oil pump 602 to an inlet of the gear train 606. A fluid path 644 may couple the outlet of the gear train 606 to the one or more valves 630. The one or more valves 630 may function as described above with respect to FIG. 6B.

Figure 6D:
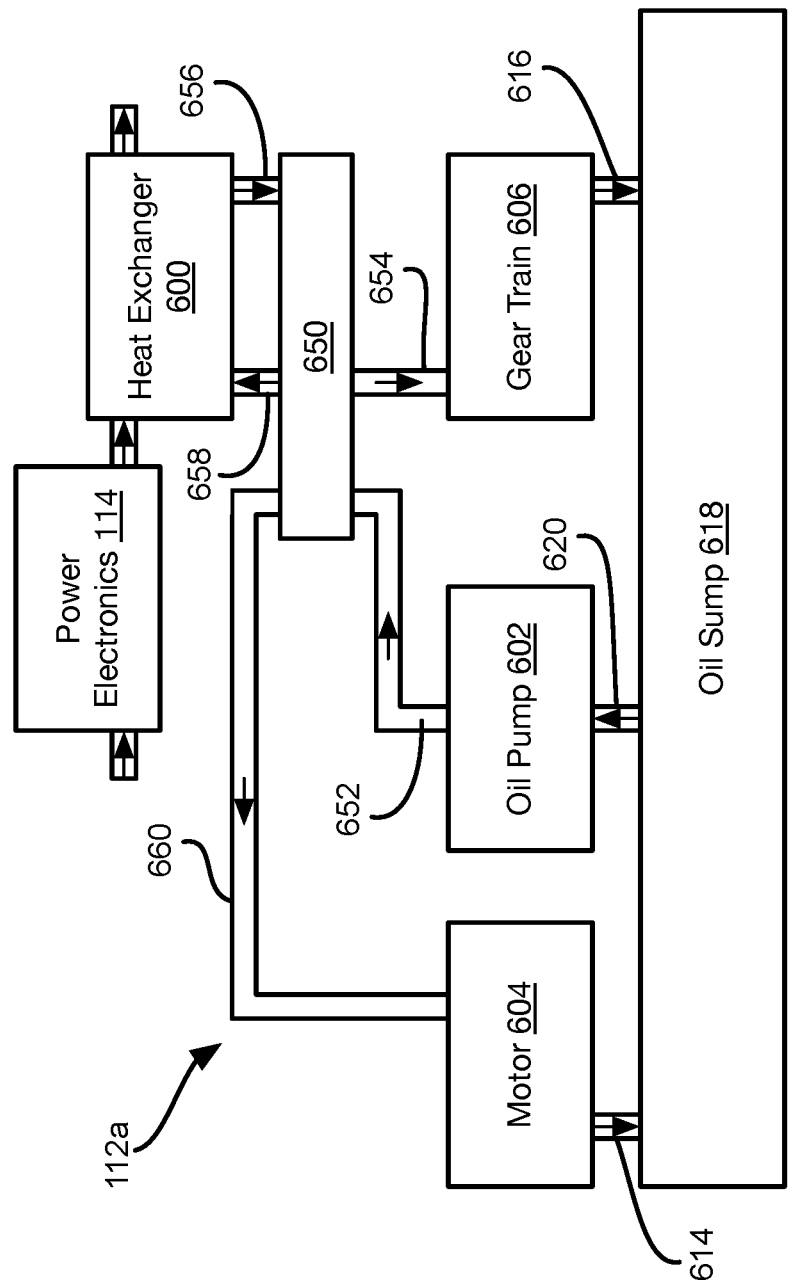

Referring to FIG. 6D, in some embodiments, the gear train 606 may either receive oil from the oil pump 602 in bypass of the heat exchanger 600 or receive oil from the heat exchanger 600. In this manner, the gear train 606 may be cooled more when the FDU 112*a* is not idled and cooled less when the FDU 112*a* is idled.

For example, one or more valves 650 may be coupled by fluid path 652 to the output of the oil pump 602 and the one or more valves 650 may be coupled by fluid path 654 to the inlet of the gear train 606. The one or more valves 650 may be coupled to the inlet of the heat exchanger 600 by a fluid path 658 and to the outlet of the heat exchanger by a fluid path 656. A fluid path 660 couples the one or more valves 650 to the inlet of the motor 604.

In a first state of the one or more valves 650, oil output by the oil pump 602 is input to the heat exchanger 600 and oil leaving the heat exchanger 600 is input to the motor 604 and gear train 606. In a second state of the one or more valves 650, oil output by the oil pump 602 is directed into both the heat exchanger 600 and into the gear train 606 in bypass of the heat exchanger 600. In a third state of the one or more valves 650, oil output by the oil pump 602 bypasses the heat exchanger 600 and is input to both the motor 604 and gear train 606. Accordingly, the degree of cooling of the gear train 606 in the first state may be greater than in the second state, and the degree of cooling of the gear train 606 in the second state may be greater than in the third state. The embodiment of FIG. 6D may therefore provide more flexibility in providing cooling or heating of the gear train 606.

Figure 7:
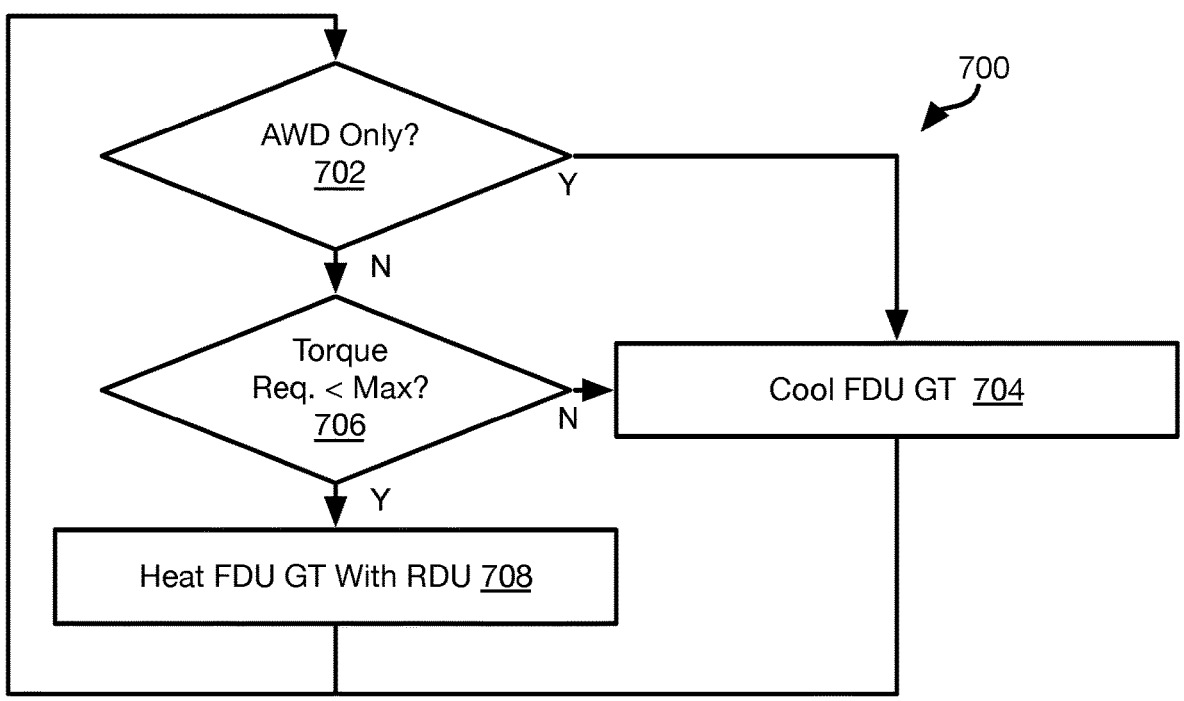
FIG. 7 illustrates a method for reducing losses in an idled drive unit in accordance with certain embodiments.

FIG. 7 illustrates a method 700 that may be executed by the control system 214 using any of the embodiments described above with respect to FIGS. 3A to 6D. The method 700 may include evaluating, at step 702, whether the vehicle 100 is in an all-wheel drive (AWD) only drive mode. An AWD only drive mode may be one in which the FDU 112a and RDU 112b are not idled regardless of torque requirement. For example, the AWD only drive mode may be an off-road drive mode or other drive mode that presumes the need for all wheels of the vehicle 100 to be powered.

If the vehicle is in an AWD only mode, the FDU 112a may be cooled, at step 704, to maintain the FDU 112a within an operational temperature range, such as between 40 and 110 degrees Celsius or some other temperature range. Cooling the FDU 112a may be accomplished by coupling the M/GT 316 of the FDU 112a to an outlet of the cooling system 300 (see, e.g., FIG. 4C and corresponding description). Cooling the FDU 112a may be accomplished by ceasing to bypass the cooling system 300 (see, e.g., FIG. 5 and corresponding description). Cooling the FDU 112a may include coupling the output of a heat exchanger 600 to the input of a gear train 606 (see, e.g., FIGS. 6C and 6D and corresponding description).

Note that, for extremely cold temperatures (e.g., less than 0 degrees Celsius), step 704 may include heating the FDU 112a. However, following a warm-up period, the heat generated by the FDU 112a when the motor 604 is powered may require cooling in order to remain within the operational temperature range in most weather conditions.

If the vehicle 100 is not found to be in an AWD only drive mode, the method 700 may include evaluating, at step 706, whether a torque requirement of the vehicle 100 is less than a maximum. The torque requirement may be derived from an accelerator pedal position imposed by a driver of the vehicle 100, an acceleration of an automated driving function, such as cruise control, adaptive cruise control, self-driving algorithm, or other automated driving function. The maximum may be the maximum torque that may be produced by the RDU 112b or some fraction thereof. The maximum torque may be based on a current temperature of the RDU 112b and torque output of the RDU 112b, e.g., the amount of additional torque that may be produced by the RDU 112b without overheating from the current temperature.

If the torque requirement is greater than or equal to the maximum, then the FDU 112a is powered to generate torque to meet the torque requirement. The FDU 112a may therefore be cooled as described above with respect to step 704.

If the torque is less than the maximum, the method may include idling the FDU 112a and heating the gear train 606 of the FDU 112a at step 708, such as according to any of the approaches described above with respect to FIGS. 3A to 6D. Heating of the FDU 112a may commence and continue as long as the FDU 112a is below a maximum temperature, such as the highest temperature of the operational temperature range, at which point cooling may be performed as described with respect to step 704. The temperature of the FDU 112a may be determined from the outputs of the temperature sensors 208, such as one or more temperature sensors 208 sensing some or all of a temperature of oil within the FDU 112a, the temperature of coolant fluid exiting the FDU 112a, or a temperature at some other location in the FDU 112a.

In some embodiments, the control system 214 may define a drive mode that is exclusively two-wheel drive. Accordingly, in various embodiments, when the vehicle 100 is in the two-wheel drive mode, the FDU 112a remains idled and heated according to step 708 at all times while the vehicle 100 is driven.

The descriptions of the various embodiments of the present disclosure have been presented for purposes of illustration. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure may exceed the specific described embodiments. Instead, any combination of the features and elements, whether related to different embodiments, is contemplated to implement and practice contemplated embodiments. Furthermore, although embodiments disclosed herein may achieve advantages over other possible solutions or over the prior art, the embodiments may achieve some advantages or no particular advantage. Thus, the aspects, features, embodiments and advantages discussed herein are merely illustrative.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a one or more computer processing devices. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Certain types of storage devices that include these mediums include: diskette, hard disk, random access memory (RAM), read only memory (ROM), erasable programmable read only memory (EPROM or Flash memory), static random access memory (SRAM), compact disc read only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, refers to non-transitory storage rather than transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but the storage device remains non-transitory during these processes because the data remains non-transitory while stored.

While the foregoing is directed to embodiments of the present disclosure, other and further embodiments may be devised without departing from the basic scope thereof, and the scope thereof is determined by the claims that follow.

What is claimed is:

1. A vehicle comprising:
    a chassis;
    a battery mounted to the chassis;
    a first drive unit mounted to the chassis and configured to drive one or more first wheels of the vehicle, the first drive unit comprising a first electric motor;
    a second drive unit mounted to the chassis and configured to drive one or more second wheels of the vehicle, the second drive unit comprising a second electric motor; and
    a control system coupled to the first drive unit and the second drive unit, the control system configured to:
        idle the first drive unit while the second drive unit is not idled and induces movement of the vehicle; and
        heat the first drive unit while the first drive unit is idled.

2. The vehicle of claim 1, wherein the first drive unit is a front drive unit and the second drive unit is a rear drive unit.

3. The vehicle of claim 1, wherein the control system is configured to heat the first drive unit by transferring heat from the second drive unit.

4. The vehicle of claim 3, wherein:
    the vehicle further comprises:
        a cooling system mounted to the chassis;
        fluid paths conducting fluid between the cooling system, the first drive unit, and the second drive unit;
        a pump configured to pump the fluid through the fluid paths; and
        one or more valves coupled to the control system and configured to control flow of the fluid through the fluid paths; and
    the control system is further configured to heat the first drive unit by causing the one or more valves to direct the fluid to flow between the first drive unit and the second drive unit in bypass of the cooling system.

5. The vehicle of claim 3, wherein:
    the vehicle further comprises:
        a cooling system mounted to the chassis;
        fluid paths conducting fluid between the cooling system, the first drive unit, and the second drive unit;
        a pump configured to pump the fluid through the fluid paths; and
        one or more valves coupled to the control system and configured to control flow of the fluid through the fluid paths; and
    the control system is further configured to heat the first drive unit by causing the one or more valves to direct the fluid to flow from the second drive unit to the first drive unit and then into the cooling system.

6. The vehicle of claim 1, wherein:
    the vehicle further comprises a cooling system mounted to the chassis, first fluid paths conducting fluid between the cooling system, the first drive unit, and the second drive unit, and a pump configured to pump the fluid through the first fluid paths;
    the first drive unit comprises a motor, a gear train, an oil pump configured to pump oil to the motor and the gear train, and a heat exchanger configured to transfer heat between the oil and the fluid; and
    the first drive unit includes a plurality of second fluid paths conducting oil between the pump, the motor, and the gear train, the plurality of second fluid paths configured to conduct oil to the gear train in bypass of the heat exchanger.

7. The vehicle of claim 1, wherein the first electric motor of the first drive unit is an induction motor.

8. The vehicle of claim 7, wherein:
    the first drive unit includes a gear train configured to transfer rotation from the one or more first wheels to the first electric motor while the first drive unit is idled; and
    the control system is configured to heat the first drive unit while the first drive unit is idled by heating oil within the gear train.

9. A method comprising:
    idling, by a control system of a vehicle, a first drive unit mounted to a chassis of the vehicle, the first drive unit configured to drive one or more first wheels of the vehicle; and
    while the first drive unit is idled, heating, by the control system, the first drive unit and powering a second drive unit mounted to the chassis to induce motion of the vehicle, the second drive unit configured to drive one or more second wheels of the vehicle, wherein a battery is mounted to the chassis, and the first drive unit and the second drive unit each comprise an electric motor.

10. The method of claim 9, wherein the first drive unit is a forward drive unit and the second drive unit is a rear drive unit.

11. The method of claim 9, further comprising, heating, by the control system, the first drive unit with heat generated by the second drive unit.

12. The method of claim 11, wherein:
    the vehicle further comprises:
        a cooling system mounted to the chassis;
        fluid paths conducting fluid between the cooling system, the first drive unit, and the second drive unit;
        a pump configured to pump the fluid through the fluid paths; and
        one or more valves coupled to the control system and configured to control flow of the fluid through the fluid paths; and
    wherein the method further comprises heating, by the control system, the first drive unit by causing the one or more valves to direct the fluid to flow between the first drive unit and the second drive unit in bypass of the cooling system.

13. The method of claim 11, wherein:
    the vehicle further comprises:
        a cooling system mounted to the chassis;
        fluid paths conducting fluid between the cooling system, the first drive unit, and the second drive unit;
        a pump configured to pump the fluid through the fluid paths; and
        one or more valves coupled to the control system and configured to control flow of the fluid through the fluid paths; and
    wherein the method further comprises heating, by the control system, the first drive unit by causing the one or more valves to direct the fluid to flow from the second drive unit to the first drive unit and then into the cooling system.

14. The method of claim 9, wherein:
the first drive unit includes a gear train, the gear train configured to transfer rotation from the one or more first wheels to the electric motor of the first drive unit while the first drive unit is idled; and
the method further comprises heating, by the control system, the first drive unit while the first drive unit is idled by heating oil within the gear train.

15. The method of claim 9, wherein heating the first drive unit comprises:
transferring heat from the second drive unit to a heat exchanger of the first drive unit by circulating fluid through fluid paths connecting the heat exchanger to the second drive unit; and
circulating oil around a motor and a gear train of the first drive unit and into thermal contact with the heat exchanger.

16. The method of claim 9,
wherein idling the first drive unit comprises ceasing to supply current to the electric motor of the first drive unit.

17. The method of claim 16, wherein the electric motor of the first drive unit is an induction motor.

\* \* \* \* \*